United States Patent [19]

Berg

[11] Patent Number: 4,792,290

[45] Date of Patent: Dec. 20, 1988

[54] WAVE ACTUATED PUMP APPARATUS

[76] Inventor: John L. Berg, P.O. Box 1282, Vallejo, Calif. 94590

[21] Appl. No.: 44,067

[22] Filed: Apr. 29, 1987

[51] Int. Cl.$^4$ ............................................. F04B 35/00
[52] U.S. Cl. ..................................... 417/332; 60/506
[58] Field of Search ............... 417/331, 332, 330, 333; 60/501, 500, 506, 505

[56] References Cited

U.S. PATENT DOCUMENTS

| | | | |
|---|---|---|---|
| 1,018,678 | 2/1912 | Nelson | 60/501 X |
| 1,540,364 | 6/1925 | Roldan . | |
| 3,274,941 | 9/1966 | Parr | 417/331 |
| 3,957,398 | 5/1976 | Lloyd | 417/331 |
| 4,076,464 | 2/1978 | Pinney | 417/332 |
| 4,105,368 | 8/1978 | Waters | 417/331 |
| 4,210,821 | 7/1980 | Cockerell | 417/332 X |
| 4,302,161 | 11/1981 | Berg | 417/333 |
| 4,413,956 | 11/1983 | Berg | 417/333 |
| 4,563,591 | 1/1986 | Jones | 417/360 X |
| 4,686,377 | 8/1987 | Gargos | 417/332 X |

*Primary Examiner*—Leonard E. Smith
*Attorney, Agent, or Firm*—Schapp and Hatch

[57] ABSTRACT

Wave actuated pump apparatus providing paired pump and main floats positionable in horizontally spaced relation on a body by liquid and joined together by an elongated arm having an end rigidly secured to a smaller pump float and an opposite end pivotally attached to the larger main float so that the arm is subject to angular displacement relative to the main float as the floats are displaced vertically with respect to each other in response to wave action in the body of liquid upon which the apparatus floats. A linearly actuatable pump pivotally secured between the arm and the main float pumps a desired fluid in response to the angular displacement of the arm relative to the main float. Operative pairs of the floats, each constituting a pumping unit, are grouped together in proximity to each other and held in such relationship by frame means with the members radiating outwardly in desired angularly spaced relation so that no two pumping units are parallel and hence no more than one pumping unit can be broadside to the travel of the waves at any one time. The pump and main floats are formed to take on water and increase their weight under high or choppy wave conditions, and are formed for automatically releasing the additional water when calmer conditions prevail.

26 Claims, 7 Drawing Sheets

WAVE ACTUATED PUMP APPARATUS

BACKGROUND OF THE INVENTION

1. Field of the Invention

This invention relates to apparatus for using the energy or waves on a body of liquid, and more particularly to apparatus adapted for utilizing such energy to operate a pump.

2. Description of the Prior Art

The constant, 24-hour action of waves on a large body of water has aroused the desire of many experimenters to harness and utilize the kinetic energy causing the waves. Such devices often utilize a fixed structure to which floats are attached, and the rising and falling of the floats relative to the fixed structure is used to drive an electrical generator, pump, or other energy producing device. In such cases, the energy often is stored until it is to be used, either by electrical storage devices or by hydraulic systems in which the liquid being pumped is elevated to storage reservoirs, or by storing the liquid in pressure reservoirs or accumulators having pneumatic or mechanical spring means capable of storing potential energy for the periods of time desired.

It has also been proposed to make wave energy recovery apparatus which is free-floating on or beneath the surface of the liquid and which provides two or more floats spaced laterally from each other so that the up and down movements of the floats in response to the waves are out of phase with each other and the number of pump impulses per unit time are accordingly multiplied.

Free floating wave pump apparatus of the character described is set forth in U.S. Pat. Nos. 4,302,161, issued Nov. 24, 1981, and 4,413,956, issued Nov. 8, 1983, both to John L. Berg, the inventor of the apparatus of the present application. In these patents, a plurality of upstanding cylinders are connected together by a subframe, with each cylinder slidably mounting a float on the outside of its cylinder, and with each float being connected to a piston within the cylinder. One way inlet and outlet valves are provided in the lower end of the cylinder and are formed so that upward movement of the piston in the cylinder draws in water and downward movement pumps out the water. While these devices provide an effective pumping action, they require that wave conditions be substantially consistent in order to achieve reasonable pumping efficiency, and the floats are prone to bind on the vertical cylinders they surround, particularly when seaweed or other debris is present.

It has been proposed to mount rocker arms on a boat, the rocker arms having floats at their outer ends which move up and down under the influence of wave action. The inner ends of the arms are utilized to operate a set of gears which, in turn, are capable of operating a generator or pump. The vertical planes in which the arms move are perpendicular to the length of the boat and hence the waves must be striking the boat at an angle in order to operate the float arms. Such structure is shown and described in U.S. Pat. No. 1,540,364 issued to Benjamin A. Roldan on June 2, 1925.

Another approach to the concept of using floats to drive reciprocal pumps may be found in U.S. Pat. No. 3,957,398 issued to Harold Lloyd on May 18, 1976. In this device, a pair of 600 foot long pontoons are mounted in spaced side-by-side relation and wave floats rest on the water in the space between the pontoons. Waves washing through the space between the pontoons are intended to raise and lower the pump floats which are directly connected to reciprocating pumps. Obviously, such device must always have the slot between the pontoons aligned with the direction from which the waves are coming in order to be operative at all.

In addition to the patents discussed above, it is believed that the patents listed below contain information which is or might be considered to be material to the examination of this application.

| U.S. Pat. No. | Inventor |
|---|---|
| 610,013 | J. Armstrong, et al. |
| 2,109,173 | W. Herndon |
| 3,335,667 | J. Murphy |
| 3,989,951 | L. Lesster, et al. |
| 4,076,463 | M. Welczer |
| 4,091,618 | A. Jackson |

These patents are believed to be relevant to the present invention because they were cited by the Examiners during the prosecution of applicant's above mentioned U.S. Pat. Nos. 4,302,161 and 4,413,956.

SUMMARY OF THE INVENTION

The wave actuated pumping apparatus of the present invention achieves improved efficiency over the prior art free floating wave pumps by utilizing a novel pumping action and arrangement not hitherto contemplated. Basically, the apparatus of the present invention consists of two floats, designated a "pump float" and a "main float". An elongated arm is pivotally attached to the main float and extends laterally therefrom to overlay the pump float, to which the distal end of the arm is rigidly attached.

A linearly actuatable pump is pivotally secured between the arm and the main float and is formed for pumping a fluid upon angular displacement of the arm relative to the main float caused by vertical displacement of the main float and pump float relative to each other under the influence of waves in the body of liquid supporting the floats. The described pump float, main float, swingable arm and pump means may be designated a "pumping unit".

In accordance with the present invention, a plurality of angularly offset pumping units are ganged together in such manner that at least two of the pumping units operate to pump fluid no matter what wave patterns are encountered, so that when one float is on a crest the other float is in a trough and vice versa. As many of the pumping units as may be desired can be utilized. However, it is preferred to avoid having the arm of the pumping unit at right angles to the direction from which the waves are coming insofar as is possible, because in such case the pump float and main float rise and fall simultaneously and no changing height differential is present for accomplishing the pumping action.

The arms joining the pairs of floats are extendable and retractable for varying the distance between the floats. Ideally, the distance between the pump float and the main float is one-half of the crest-to-crest distance of the waves most likely to be encountered. Should the waves become shorter, the telescoping arms can also be made shorter and, should the distance between the crests of waves become longer, the arms can be extended accordingly.

The pump, pivotally connected between the arm and the main float expands and contracts axially as the arm moves up and down in response to the vertical displacement of the pump float by the waves.

In accordance with the invention, the distal end of the pump is movable along the arm to selected positions for varying the operating angle of the pump relative to the main float. In one form of the invention, the arm has an extension past the pivotal connection to the main float in direction away from the pump float, and a second linearly operable pump is pivotally attached to such extension and to the main float. With this configuration, one pump or the other will be pumping at all times as the pump float and main float are displaced vertically relative to each other. For example, the pump nearest the pump float can exert its downward pumping stroke as the pump float descends relative to the main float, and the rear pump can exert its downward pumping stroke as the pump float rises relative to the main float.

The output of the pumps can be used to operate electrical generators or other machinery, or the energy of the pumped liquid may be stored by pumping the liquid up to an elevated reservoir or pumping it directly into an accumulator providing an enclosed pressure reservoir partially filled with air to act as a pneumatic spring.

The pump float is weighted so that, as the wave passes from the pump float, gravity forces the pump float downwardly against the resistance of the pump to accomplish the described pumping action. The pump float is formed to provide floatation considerably in excess of the weight thereof so that the pump float rises under the influence of a rising wave against the resistance of the rear pump as it performs the pumping action.

In one form of the invention, the floats are formed for automatically and selectively adding to and subtracting weight from the floats in accordance with the height of the waves. The floats are of flattened, generally disk shape with a peripheral upstanding wall adapted for containing liquid washing over the wall from relatively high waves so that the float will tend to sink lower in the body of liquid. The peripheral upstanding wall is formed with a ring of egress only flapper valves near the base of the peripheral upstanding wall for automatically releasing the liquid contained by the wall as the level of the body of liquid lowers with respect to the float, such as when a wave trough passes.

It is also contemplated that a further ring of ingress openings is provided in the upstanding wall a spaced distance above the ring of flapper valves to further provide at least partial filling of the space circumscribed by the wall by waves not quite high enough to wash over the top of the wall. Each of the floats is provided with a liquid reservoir to provide the required amount of weight to accomplish pumping even though the space encircled by the peripheral upstanding wall is empty of water. This reservoir is at the bottom of the float and is formed to facilitate easy draining of the water from the floats when the pumping units are to be transported.

In accordance with the present invention, each pumping unit (consisting of a pump float, a main float, the arm pivoted to the main float and rigidly attached to the pump float, and the pump pivotally connected between the arm and the main float) can be used by itself or can be connected together in groups. In the multiple pumping unit configuration, the vertical planes of the arms of the pump units are not parallel to each other so that only one of the multiple pumping units can be perpendicular to the direction of travel of the waves at any one time, and hence at least partially inoperative for pumping, from whatever direction the waves are coming when they impinge upon the group of pumping units.

An arrangement of three pumping units having their main floats grouped together and held in position by a frame, and extending generally radially therefrom to position the pump floats in circumferentially spaced relation around the frame, is particularly well adapted for achieving pumping efficiency under a wide range of wave conditions. One of the pump floats is chosen as the "lead float" with its arm projecting from the main float toward the direction from which the waves are coming. The entire pumping unit is anchored against drifting away by a cable attached into the frame in such manner that the lead float will remain in the desired orientation relative to the direction of travel of the waves.

It should be understood, however, that waves on a body of liquid such as a lake, stream ocean do not necessarily come from the same direction because of currents, conflicting winds, etc. This is particularly true in the case of lakes, streams and estuaries or the like. Where the waves do not come from the same direction, the radiating arrangement of the pump units insures that maximum pumping action is obtained from whatever direction the waves are coming when they impinge upon the pumping units.

The pumping units can be positioned at equal angular spacing relative to each other, particularly where the waves appear to be coming from many directions. Where the waves are moving generally in a single direction, increased pumping efficiency is achieved by positioning two of the pumping units so they trail the lead pump unit somewhat closer together than would be the case if the angular spacing between adjacent pump units were equal. Thus, for such situations, the trailing pump units may diverge laterally to the sides of the plane of the lead pump unit at an angle of between about 30° and about 60°. This still maintains the desired condition that no two of the pump units are parallel and hence no two or more of the pump units can be broadside to the direction from which the waves are coming at any one time.

It is therefore an object of the present invention to provide a free-floating wave actuated pump apparatus capable of efficient pumping action no matter what wave patterns, directions and intensities are encountered.

Another object of the present invention is to provide a wave actuated pump apparatus of the character described in which a plurality of pumping units are secured together in such manner that the direction of travel of the waves is never broadside to more than one of the pumping units at a time.

A further object of tee present invention is to provide wave actuated pump apparatus of the character set forth in which the distance between the pump floats and their associated main floats may be shortened or lengthened in accordance with wave conditions.

A still further object of the present invention is to provide wave actuated pump apparatus of the character set forth in which the weight of the pump floats may be varied in accordance with different types, directions and magnitudes of wave action.

Yet another object of the present invention is to provide wave actuated pump apparatus of the character set forth in which the operating weight of the pump floats varies automatically in response to the magnitude of wave action.

Another object of the present invention is to provide wave actuated pump apparatus of the character described which is ruggedly constructed for long life under extreme wave conditions and yet is light in weight for easy transporting from one location to another.

Other objects and features of advantage will become apparent as the specification progresses and from the claims.

While only the preferred forms of the invention are illustrated in the drawings, it will be apparent that various modifications can be made without departing from the ambit of the claims.

DESCRIPTION OF THE PREFERRED EMBODIMENTS

As may be seen in the accompanying drawings, the wave actuated pump apparatus of the present invention provides a pump float 21 and a main float 22 positionable in horizontally spaced relation to each other on a body of liquid 23, an elongated member or arm 24 having an end 26 secured to the pump float 21 and an opposite end 27 pivotally attached at 28 to the main float 22 whereby the arm 24 is subject to angular displacement relative to the main float 22 as the floats 21, 22 are displaced vertically with respect to each other in response to wave action in the body of liquid 23, and a linearly actuatable pump 29 pivotally secured between the arm 24 and the main float 22 and formed for pumping the fluid upon the described angular displacement of arm 24 relative to the main float 22.

Figures 3, 4:
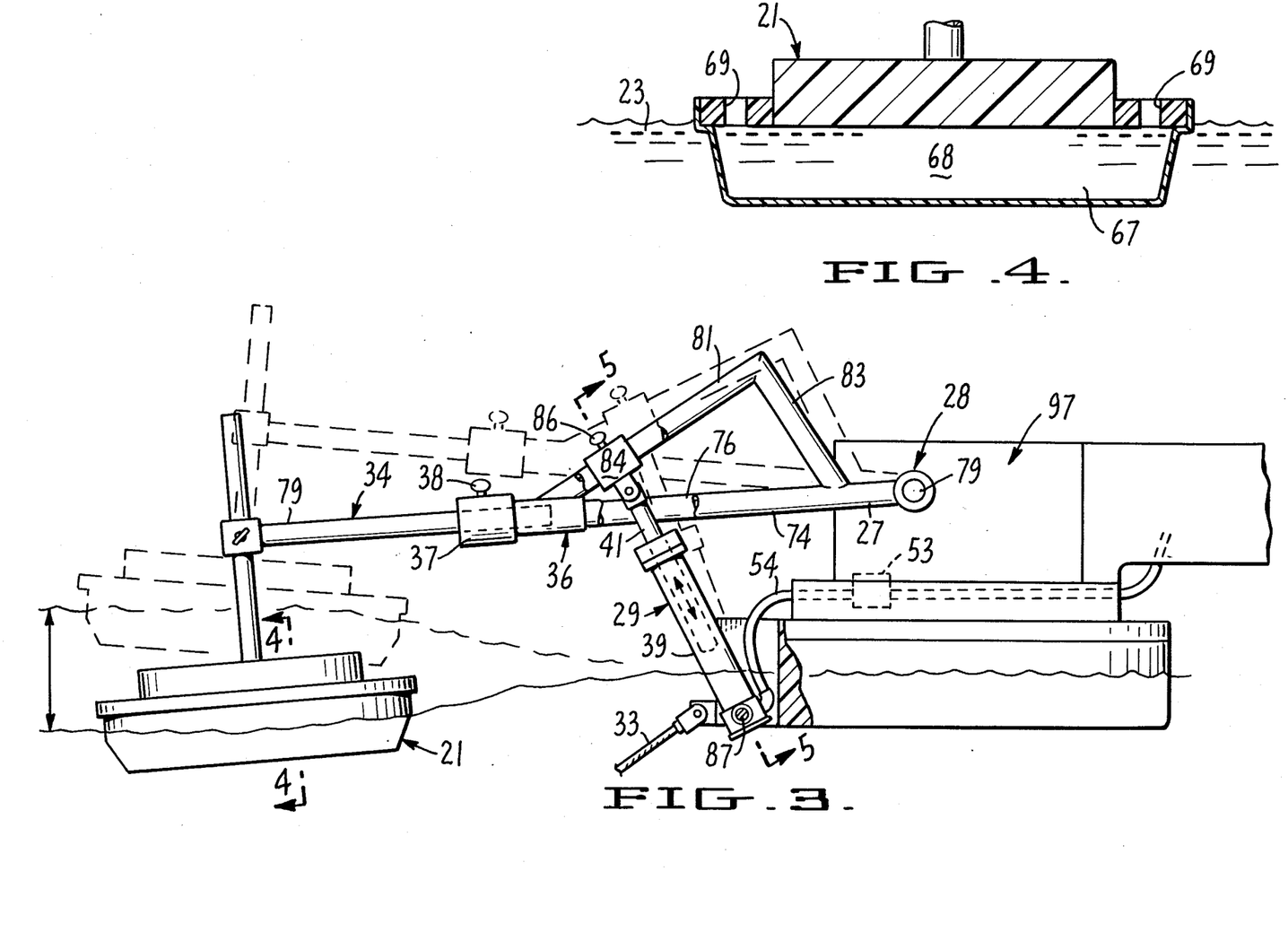
FIG. 3 is a side elevational view on an enlarge scale of a pumping unit forming part of the apparatus of FIGS. 1 and 2, with portions of the drawing being broken away and shown in section for clarity of illustration.
FIG. 4 is a vertical cross-sectional view taken substantially on the plane of Line 4—4 of FIG. 3.

The pump float 21, main float 22, arm 24 and pump 29 comprise an individual pumping unit 31 which can be operated singly or in multiples. Waves passing the pumping unit 31 to greater or lesser degree effect relative vertical displacement of the pump float 21 and main float 22 to accomplish the desired pumping action. When the plane of the pumping unit (a vertical plane bisecting floats 21 and 22 and arm 24) is substantially perpendicular to the waves 32, such plane will be substantially parallel to the direction of motion of the wave so as to cause maximum relative vertical displacement between pump float 21 and main float 22 and maximum pumping action will ensue.

Where the waves are substantially parallel to the plane of the pumping unit, their direction of movement is perpendicular to such plane and the waves impinge upon the pumping unit broadside. In this condition, both floats will rise simultaneously and fall simultaneously and no relative vertical displacement between the float takes place and there is no pumping action. Therefore, it is desirable to keep the plane of the pumping unit parallel to the direction of travel of the waves as by a tether 33. Of course, it is necessary to keep the plane of the pumping unit substantially vertical so that the unit does not tip over. This may be accomplished by making the floats 21 and 22 of sufficient width and ballasting them with water, see FIG. 4 of the drawings, or the pumping units may be steadied by suitable conventional outriggers (not shown).

In accordance with the present invention, it is desirable to be able to adjust the spacing between the pump float 21 and main float 22 in accordance with the spacing of the waves being encountered. Preferably, the pump float 21 should be spaced from main float 22 by a distance equalling one-half of the distance between adjacent wave crests. Thus, when the pump float is on a wave crest, the main float will be at the bottom of the trough between waves, and vice versa.

Adjustment of the spacing between pump float 21 and main float 22 is here accomplished by forming the arm 24 from a plurality of sections 34 and 36 telescoped together and relatively slidable for adjusting the effective length of the arm 24. As may best be seen in FIG. 3 of the drawings, arm section 34 telescopes within a sleeve 37 forming part of section 36. Locking of sections 34 and 36 in the desired relative positioning of the sections is provided by a set screw 38 threadably engaged through an enlarged portion of sleeve 37 to bear against section 34. Thus, the set screw 38 acts as a releasable means for selectively locking the sections 34 and 36 in the desired positions.

The pump 29 is particularly adapted for operation as a component of the pumping unit 31. While any linearly actuatable pump could be used, the reciprocating pump structure best seen in FIG. 5 of the drawings is prefered because of its efficiency and self-cleaning action. It should be understood that the wave actuated pump apparatus of the present invention is likely to be used in the ocean and in lakes and streams having floating weeds and other debris. Many pumps have close tolerances which causes them to seize up and no longer be workable if floating weeds or debris get into the pump. The pump 29 of the present invention avoids these problems.

Figures 5, 6, 7:
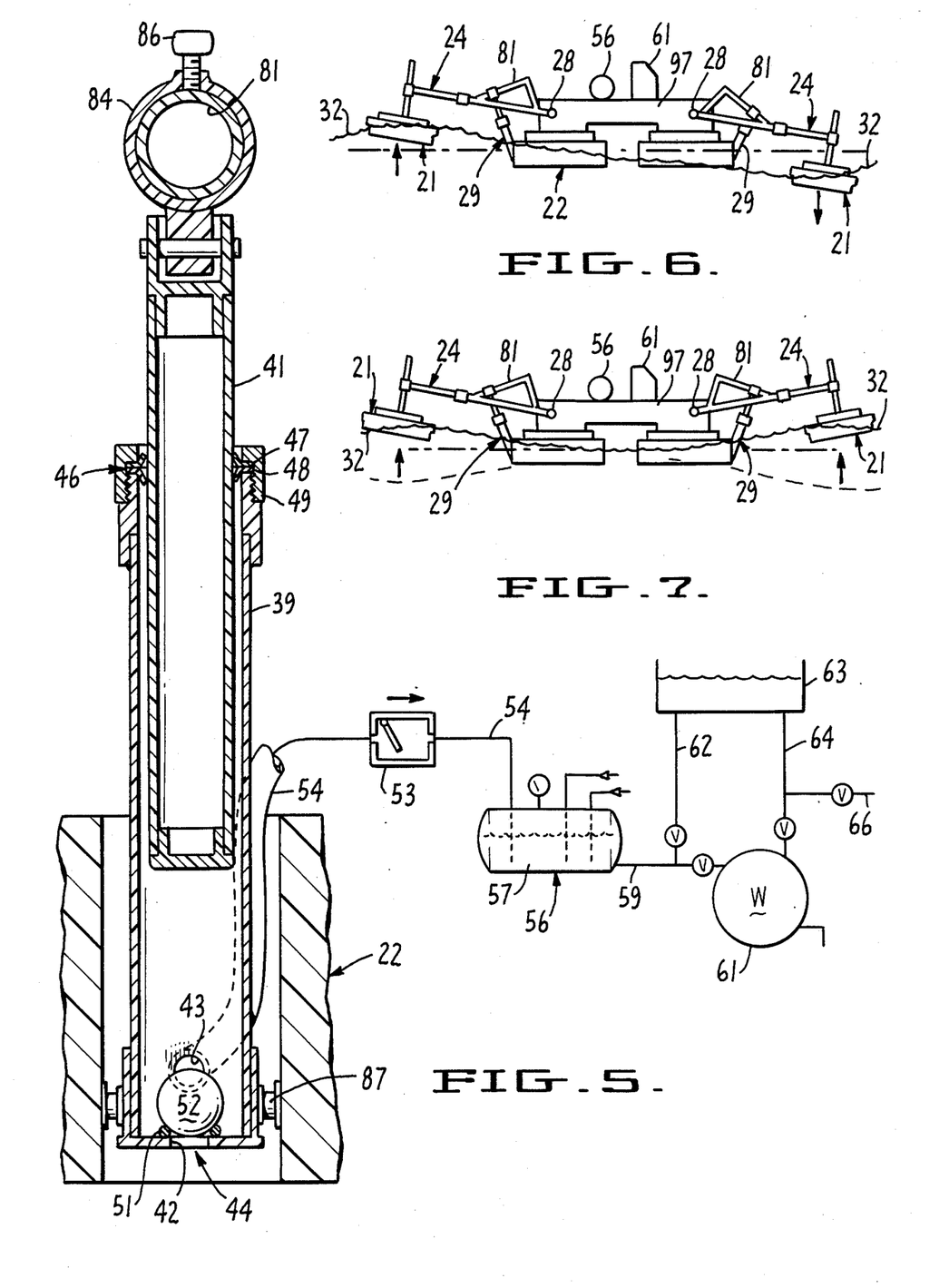
FIG. 5 is a vertical cross-sectional view on an enlarged scale of a pump forming part of the apparatus of the present invention, the view being taken substantially on the plane of Line 5—5 of FIG. 3.
FIG. 6 is a diagramatic side elevational view of the apparatus of FIG. 1 showing the relative position of the parts under one wave condition.
FIG. 7 is a view similar to that of FIG. 6, but illustrating the relative positioning of the parts of the apparatus under a different wave condition.
Figure 8:
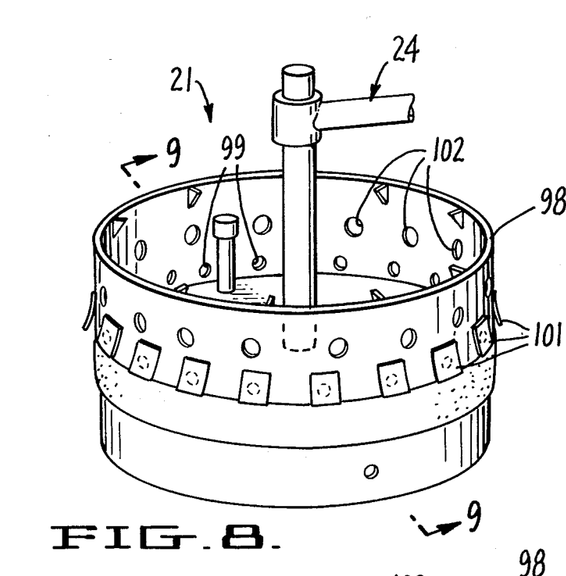
FIG. 8 is a perspective view of a modified pump float to be substituted for the pump float of FIG. 1.
Figure 9:
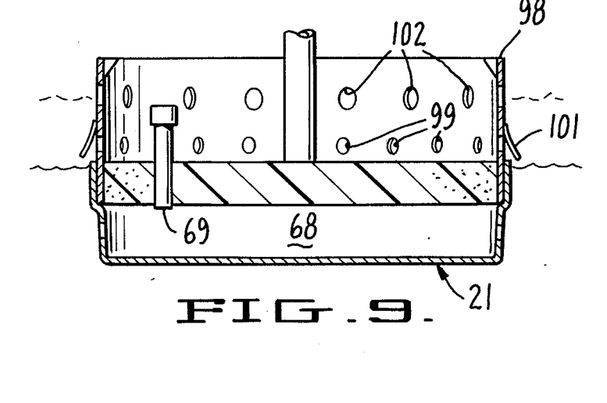
FIG. 9 is a vertical cross-sectional view taken substantially on the plane of Line 9—9 of FIG. 8.
Figure 10:
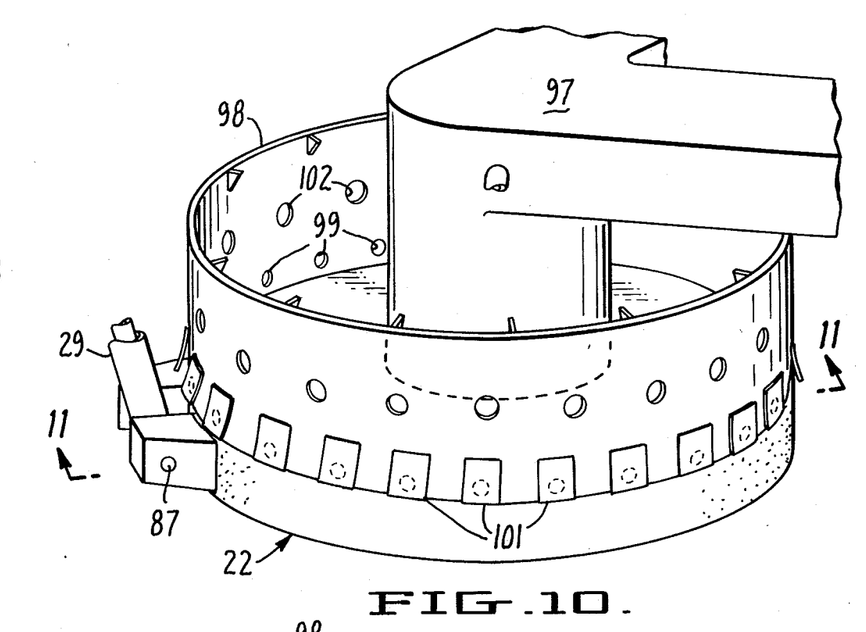
FIG. 10 is a modified form of main float to be substituted for the main float of the apparatus of FIG. 1.
Figure 11:
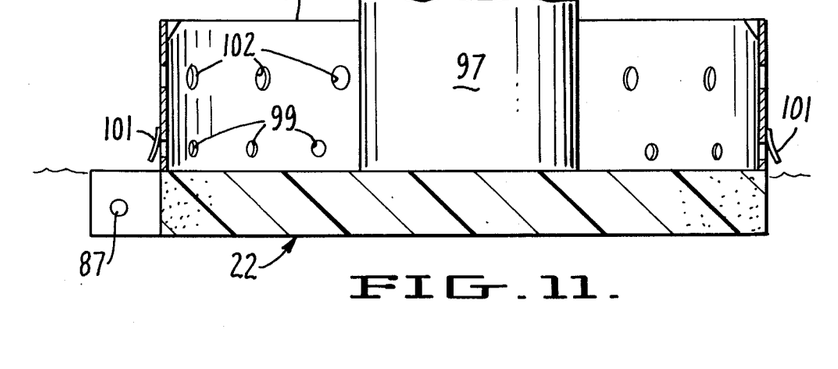
FIG. 11 is vertical cross-sectional view taken substantially on the plane of Line 11—11 of FIG. 10.

As illustrated in FIG. 5, the pump 29 is in the form of a tubular housing 39, a piston 41 axially reciprocable in the housing 39, an inlet port 42 formed through the bottom of the housing 39 and communicable with a source of fluid to be pumped, an outlet port 43 formed in the side of housing 39, and valve means 44 formed for automatically closing off the inlet port 42 when the piston 41 is forced into the housing 39 and for opening the inlet port 42 when the piston 41 is pulled from the housing Piston 41 is cylindrical and is coaxially spaced by a considerable distance from the side surface of the housing 39. A circumferential sliding seal or gland 46 is mounted in the space between the upper end of housing 39 and the piston 41. Preferably, gland 46 includes a pair of rings 47 and 48 having their outer edges clamped between a nut 49 and the upper end of the housing 39. The inner peripheral portions of the rings 46 and 47 are flexible and are bent apart so that their resilience will hold them in intimate sliding contact with the outer periphery of the piston 41.

The check valve means 44 utilizes a resilient O-ring 51 as a valve seat surrounding inlet port 42. The valve member itself is a glass ball 52 which, when forced downwardly against valve seat 51 effectively seals off the inlet port. The ball 52 is displaced from the valve seat 51 by the inrush of water on the upstroke of pump piston 41. A check valve 53 is interposed in a conduit 54 which empties into a pressurized accumulator reservoir 56 to prevent liquid from returning to pump 29.

As shown schematically in FIG. 5, the accumulator 56 contains a body of water 57 being pumped into the accumulator and a volume 58 of air which, when compressed by ingress of the water 57, acts as a pneumatic spring to store the energy exerted by the pump 29. A conduit 59 leads to a device 61 for utilizing the energy of the water 57 under pressure, such as a hydroelectric generator. Alternatively if it is desired to store the energy over lengthy periods, the energy can be used to elevate the water through a conduit 62 to a vertically spaced reservoir 63. The potential energy of the water stored in reservoir 63 can then be used as desired by draining it from the reservoir through a conduit 64 and thence to the device 61 or, through a conduit 66 for whatever use may be desired involving water under the pressure of gravity.

As a feature of the present invention, the floats 21 and 22, and particularly pump float 21, are provided with weight or ballast sufficient to actuate the pump 29 by downward movement of the arm to which it and the pump float are attached. The weight or ballast 67 in the pump float 21 is heavy enough to cause urging of the pump float downwardly relative to the main float 22 as the crest of a wave passes from under the pump float 21 with sufficient force to displace the piston 41 into the housing 39 and cause pumping action. Preferably, and as here shown, the weight 67 at the pump float 21 is provided by a chamber 68 attached to the pump float and formed to contain a predetermined quantity of liquid from the body of liquid 23 in which the device floats.

It should be appreciated that the pumping apparatus of the present invention is suitable for use with any liquid collected in a body and having waves traversing its surface. Obviously, the apparatus of the present invention is particularly adapted for use on water. In such case, water from the body 23 enters into chamber 68 through passages 69. When it is desired to remove the present apparatus from the water and transport it to another location, the water may be drained from chamber 68 through the openings 69 so as to reduce the weight of the apparatus.

Figure 1:
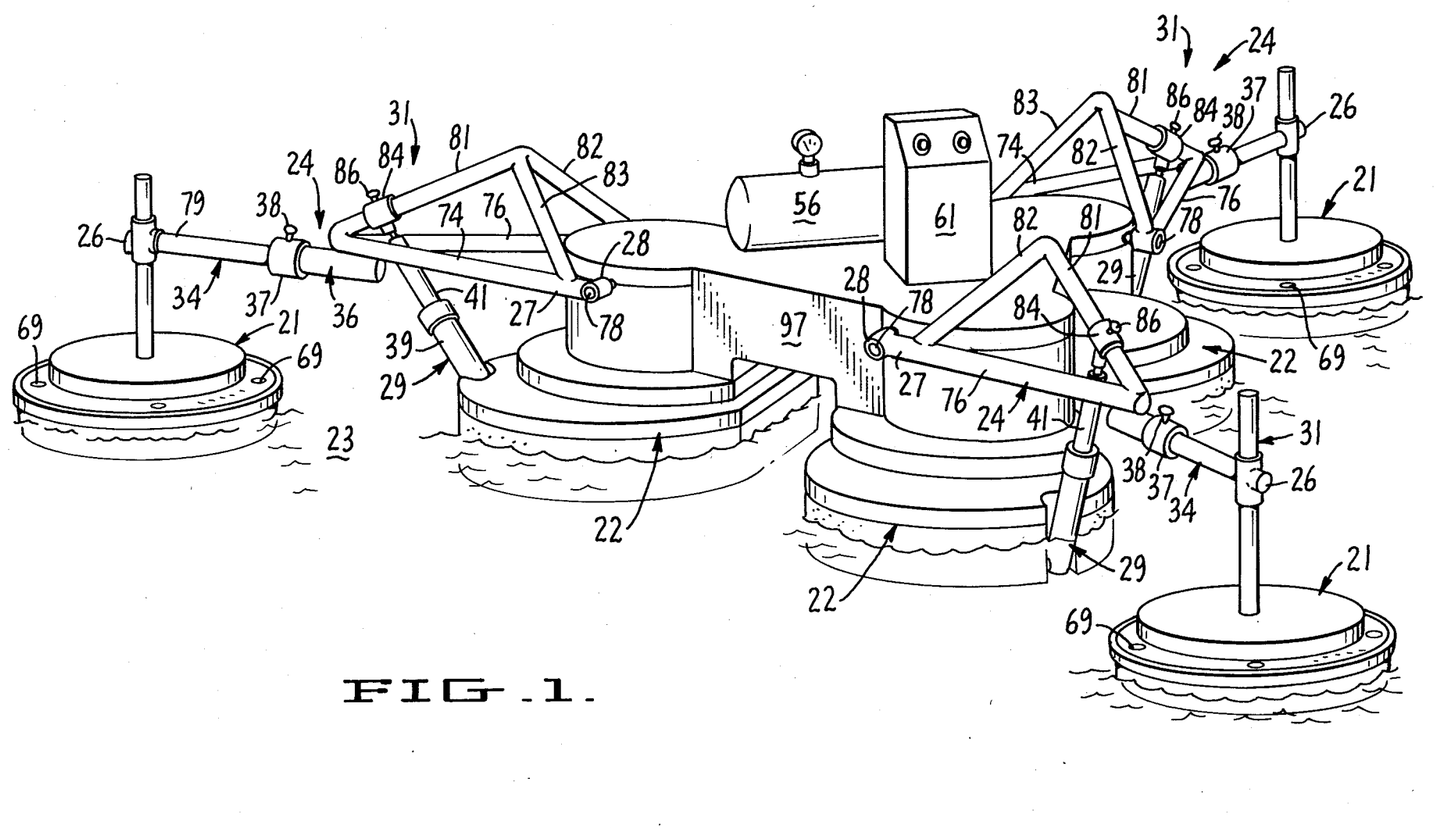
FIG. 1 is a perspective view of a wave actuated pump apparatus constructed in accordance with the present invention and shown in operative position on a body of liquid.
Figure 2:
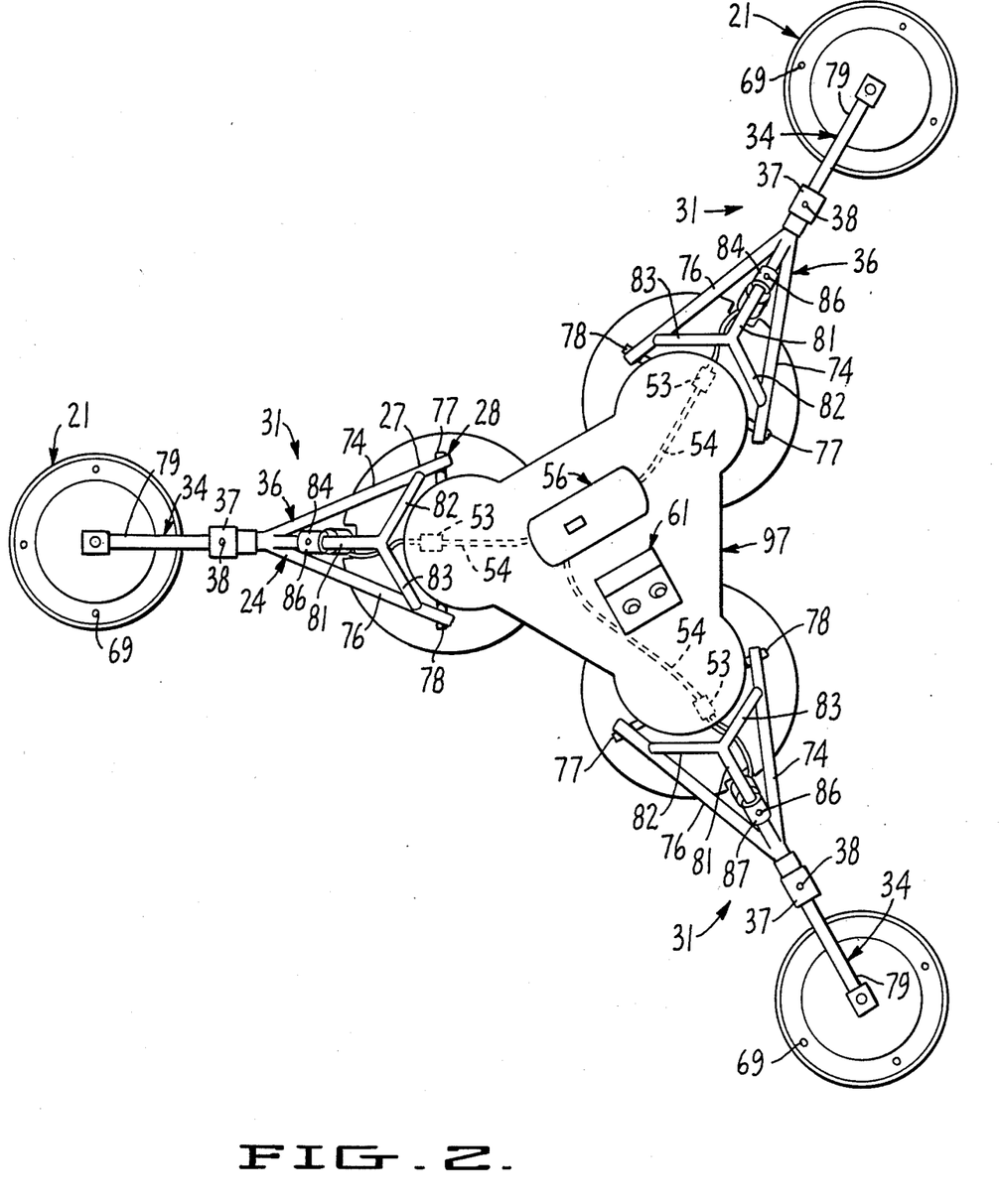
FIG. 2 is a plan view on a somewhat reduced scale of the apparatus of FIG. 1.

In the form of the invention illustrated in FIGS. 1, 2 and 5, the accumulator reservoir 56 comprises a tank supported above the main float 22 and formed to contain the liquid 5 pumped into the tank and the air cushion 58. The tank 56 has an outlet 59 connectable to the apparatus 61 for utilizing the energy stored in the tank as the liquid 57 is pumped in.

Figure 12:
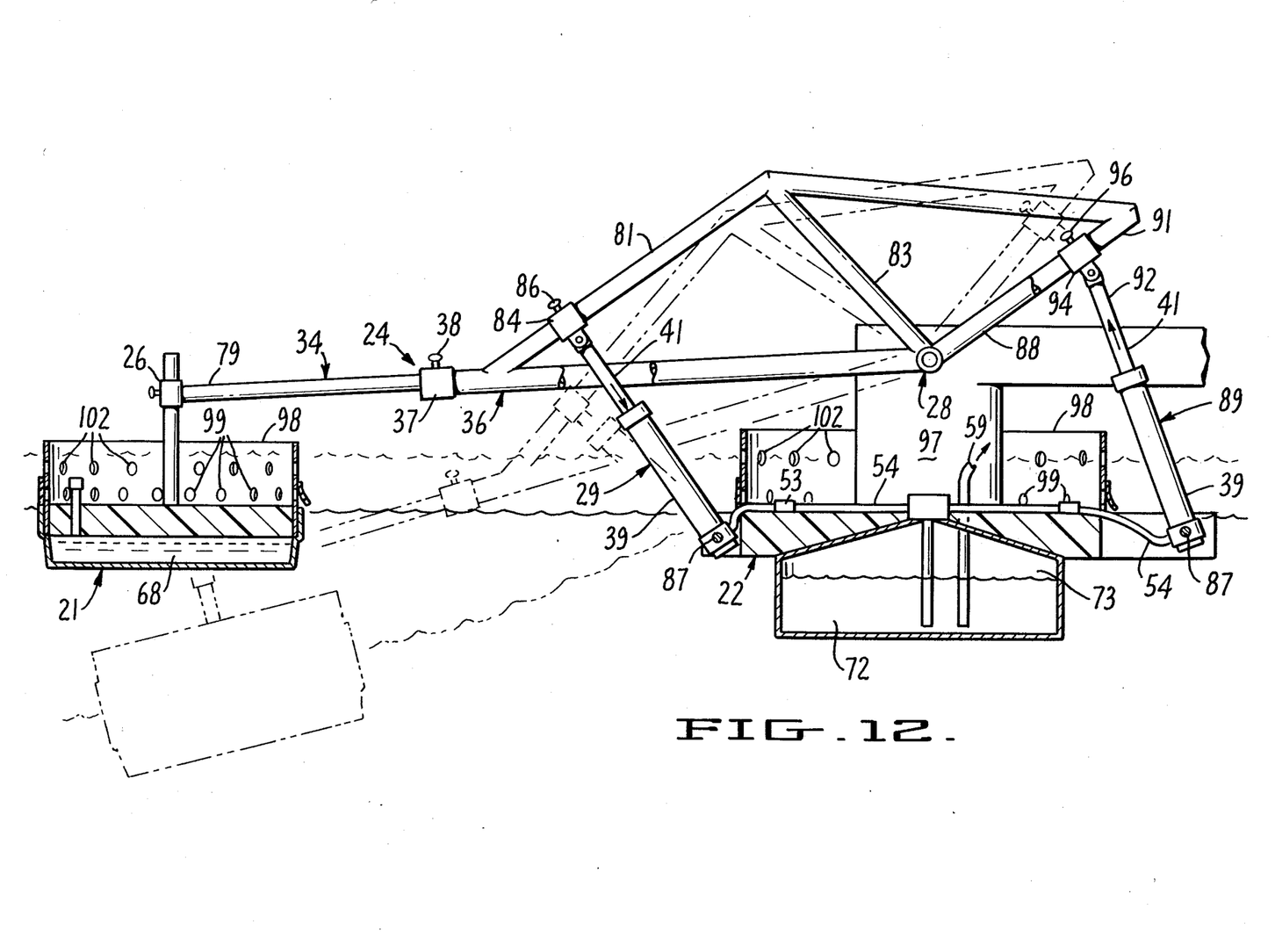
FIG. 12 is a vertical cross-sectional view through a pumping unit substantially similar to the pumping unit of FIG. 3, but illustrating a modified form in which two pumps are used for achieving pumping action upon both upward and downward relative movement of the pump float.

In the form of the invention illustrated in FIG. 12 of the drawings, the reservoir 56 is in the form of a tank 71 built into the float 22A. The accumulator reservoir 56 provided by tank 71 functions in a manner similar to tank 70 located on the main float or floats 21. Tank 21 contains water 72 from the pumps 29 and a pneumatic cushion of air 73 for storing energy. The tank 71 is concealed from view and protected from being struck by floating objects, and the water 72 provides ballast weight at the main float.

In order to strengthen and steady the arm 24 against lateral twisting, the rearward section 36 is of A-frame construction having the ends of the legs 74 and 76 swingably mounted on pins 77 and 78 carried by the main float 22 to provide the aforementioned pivotal attachment 28 of the arm 24. The lateral spacing of pivots 77 and 78 stablize arm 24 against twisting so that end 79 remains above the pump float 21.

The arm 24 is further strengthened by means of a tripod member having a front leg 81 and two rear legs 82 add 83 mounted above the A-frame portion with the end of the front leg 81 attached to section 36 at the apex of the A and the ends of the rear legs 82 and 83 attached to the legs 74 and 76 of the A near the pivotal connections 77 and 78.

Also in accordance with the present invention, the operating angle of the pump 29 relative to the main float 22 is adjustable. This is accomplished by pivotally securing the outer end of piston 41 to a collar 84 selectively positionable along the front leg 81 of the tripod and locking the collar 84 in the desired positions with releasable locking means such as thumbscrew 86. The lower end of the pump housing 3 is pivotally attached at 87 to the main float 22.

As heretofore described, the pumping stroke of pump 29 is accomplished upon downward movement of the pump float 21. However, it should be apparent that the pumping stroke could also be accomplished by upward movement of pump float 21 relative to main float 22. Such an arrangement is illustrated in FIG. 12 of the drawings wherein the arm 24 is formed with an extension 88 projecting past the pivotal connection 28 of the arm 24 to the main float 22. A second linearly actuatable pump 89 is pivotally secured between the distal end 91 of extension 88 and the main float 22. Pump 89 is formed for exerting its pumping stroke as the pump float 21 rises relative to the main float 22, while the pump 29 is formed for exerting its pumping stroke as the pump float 21 descends relative to the main float 22.

The pump 89 is constructed internally in a manner similar to that of pump 29, as illustrated in FIG. 5 of the drawings, and the distal end 92 of the pump is pivotally connected to a sleeve 94 having a releasable locking means in the form of a thumb screw 96 for securing the collar 94 in the desired position along extension 91.

As an important feature of the present invention, a plurality of the pumping units 31 are capable of being secured together in a configuration in which at least some of the pumping units are operative to pump liquid no matter what wave patterns and directions of wave are encountered. The pumping units 31 each constitute an operative pair of pump floats 21 and main floats 22 joined together by arm 24 and pump 29. The operative pairs, or pumping units 31 are grouped together in proximity to each other and held in such relationship by frame means 97 with the arms 24 radiating outwardly in desired angular spaced relation to each other so as to position the pump floats 21 on the ends of the arms 24 in radially and circumferentially spaced relation to the main floats 22. The operative pairs, or pumping units, are positioned so that their planes are never parallel to each other so that, no matter from which direction the waves are coming at any given time, not more than one of the pumping units can receive the waves broadside. The described construction also provides a unit which is very stable even under extreme conditions.

It has been found that an arrangement of three pumping units affords an effective and efficient pumping action under a wide variety of wave conditions, and the triple arrangement is illustrated in the drawings although other radiating configurations can be used.

Preferably, the tether 33 is secured to a fixed object constituting an anchor means (not shown), and the tether is attached to the apparatus in such manner that the pump float 21 on one of the pumping units 31 faces the direction from which the waves are coming so that all three of the pumping units receives the waves other than broadside, and all three pumping units are actively pumping whenever waves are present.

Figure 2A:
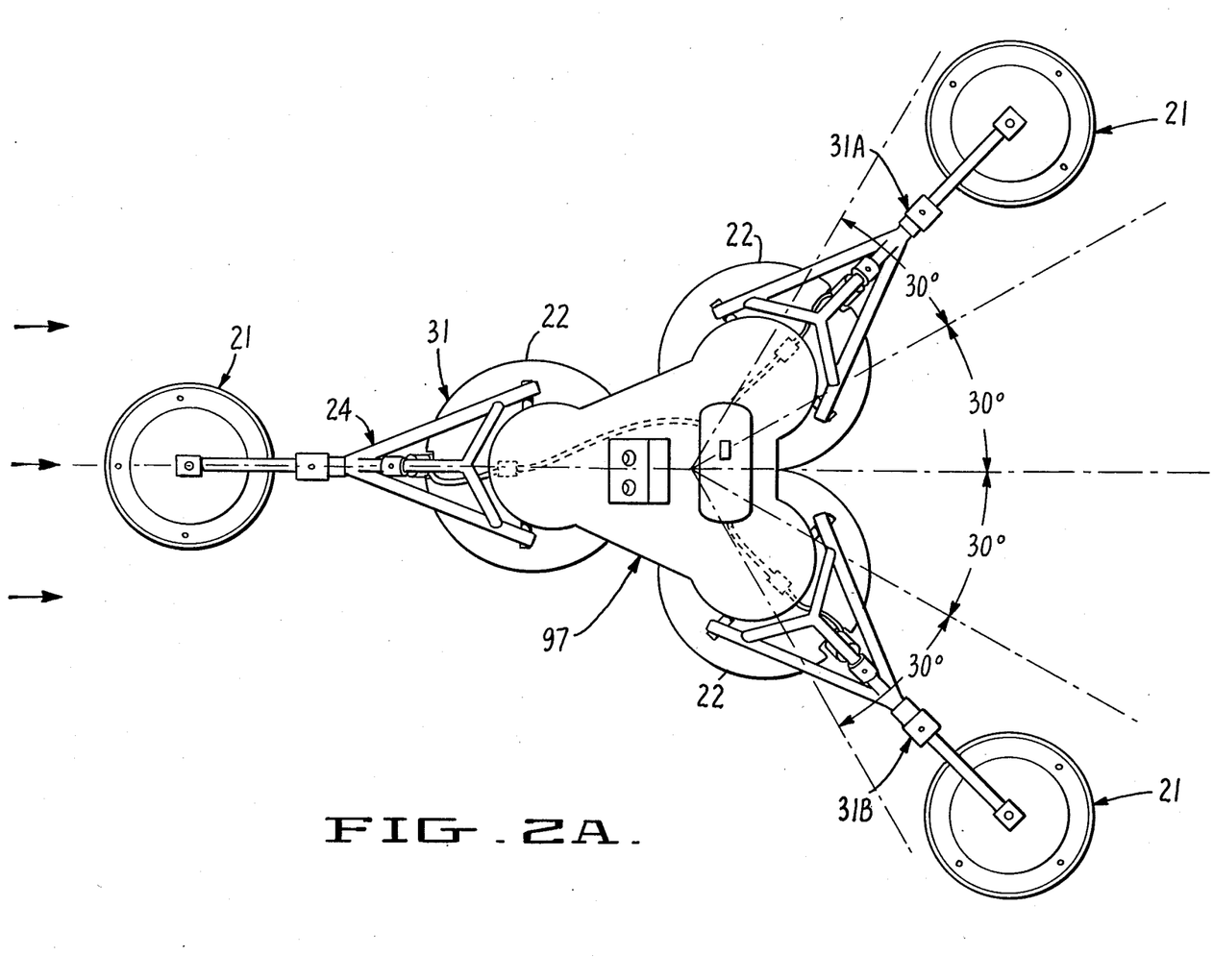
FIG. 2A is a view similar to that of FIG. 2 but showing a somewhat different angular relationship of pumping units.

As shown in FIG. 2 of the drawings, the pumping units 31, 31A and 31B have equal angular spacing from each other so that the pumping units define the corners of an equilateral triangle. Where wave conditions are encountered in which waves usually come from the same direction, increased efficiency may be attained by having the two trailing pumping units 31A and 31B diverge laterally from each other to the sides of the plane of pumping unit 31 at an angle of between about 30° and about 60°. Of course, if the waves would always come from the same direction contrary to most conditions, the pumping units might be mounted parallel to each other and with their vertical planes parallel to the direction from which the waves are coming. However, where the direction of the waves shifts from time to time, it is desirable that the trailing pumping units 31A and 31B not be parallel to each other lest they be, at times, broadside to the direction of the waves and hence inoperative for pumping. FIG. 2A of the drawings illustrates a structure similar to that of FIG. 2, but modified so that the pumping units 31A and 31B diverge from the plane of pumping unit 31 by approximately 45°.

Under certain conditions, particularly where the waves are high and/or choppy, it is desirable to add additional weight to the pump float 21 and main float 22 so the pumping apparatus will ride lower in the water, even to the point of being partially submerged. This is here accomplished by forming the floats 21 and 22 to be capable of automatically and selectively adding to and subtracting weight from the floats in accordance with the height of the waves.

Such floats are illustrated in FIGS. 9 through 12 of the drawings. As there shown, each of the floats 21 and 22 are of flattened generally disk shape with a peripheral upstanding wall 98 providing a cup adapted for containing liquid washing over the wall from relatively high waves. The floats 21 and 22 tend to sink lower in the body of liquid as the space encircled by the wall 98 is filled with the liquid.

The walls 98 are provided with liquid release means formed for automatically releasing the liquid contained by the cup provided by wall 98 as the level of the body of liquid 23 lowers with respect to the float 21 or 22 as a wave trough passes from under the float. This automatic release of the liquid contained by the wall lessens the weight on the float and allows it to tend to rise in the body of liquid 23.

Preferably, and as here shown, the release means is provided by forming the upstanding wall 98 with a plurality of release openings 99 and mounting flapper valve members 101 on the outside of wall 98 in overlying relation to each of the release openings 99. The flapper valve members are flexible and operate only to permit passage of the liquid from within the cup provided by peripheral wall 98 when the level of such liquid rises above the level of the ring of release openings 99 formed in the wall 98 adjacent to its base.

It has also been found desirable to provide a second ring of ingress openings 102 in the peripheral upstanding wall in vertical spaced relation above the ring of release openings 99. With the described structure, the modified float members are capable of operating automatically and unattended to sink the floats 21 and 22 lower in the liquid when extreme wave conditions are encountered and to allow the floats to rise as the extreme wave conditions diminish.

From the foregoing, it will be seen that the wave actuated pump apparatus of the present invention provides a novel and efficient flexible structure capable of continuing its pumping action under a wide variety of wave conditions and liquid environments.

I claim:

1. A wave energy collection apparatus, comprising
a rigid frame,
float means adapted to float in a body of water having waves and formed for supporting said frame for joint rising and falling action responsive to said waves,
a plurality of pump floats adapted to float in said body of water and positioned in circumferentially spaced relation around and in radially spaced relation to said float means,
a plurality of elongated arms each of which is pivoted at one end on said frame and is rigidly connected at its other end to one of said pump floats,
a reciprocating pump having an elongated housing and a piston reciprocable therein,
and pivot means swingably securing said housing and piston between said frame and one of said arms for actuating said pump in accordance with relative movement between said arm and said frame.

2. Wave actuated pump apparatus, comprising
pump and main floats positionable in horizontally spaced relation on a body of liquid,
an elongated member having an end secured to said pump float and an opposite end pivotally attached to said main float whereby said member is subject to angular displacement relative to said main float as said floats are displaced vertically with respect to each other in response to wave action in said body of liquid, and a linearly actuatable pump having opposite ends pivotally secured to said member and said main float and formed for pumping a fluid upon movement of said ends toward and away from each other in response to said angular displacement of said member relative to said main float.

3. A wave actuated pump apparatus, as described in claim 2, and wherein said member comprises a plurality of sections telescoped together for adjusting the effective length of said member, and releasable means is provided for selectively locking said sections in a desired position.

4. A wave actuated pump apparatus, as described in claim 2, and wherein said pump comprises a tubular housing pivotally attached to said main float, a piston axially reciprocable in said housing, said housing having an inlet port communicable with a source of said fluid and an outlet port, and valve means formed for automatically closing off said inlet port when said piston is forced into said housing and for opening said inlet port when said piston is pulled from said housing.

5. A wave actuated pump apparatus, as described in claim 1, and wherein said pump is formed for forcing of said piston into said housing upon movement of said pump float downwardly relative to said main float, and said pump float is provided with a weight sufficient to cause urging of said pump float downwardly relative to said main float with sufficient force to displace said piston into said housing and cause pumping action as a wave passes.

6. A wave actuated pump apparatus, as described in claim 5, and wherein said weight at said pump float comprises a chamber at said pump float formed to contain a predetermined quantity of said liquid.

7. A wave actuated pump apparatus, as described in claim 6, and wherein an opening in said float permits liquid to enter said chamber for use in pumping and permits draining of, said chamber for transport of said apparatus to a different location.

8. A wave actuated pump apparatus, as described in claim 2, and wherein means is provided on said floats for automatically and selectively adding to and subtracting weight from said floats in accordance with the height of the waves.

9. A wave actuated pump apparatus, as described in claim 8, and wherein said floats are of flattened generally disk shape with a peripheral upstanding wall for containing liquid washing over said wall from relatively high waves whereby said float tends to sink lower in said body of liquid, and have liquid release means formed for automatically releasing said liquid contained by said wall as the level of said body of liquid lowers with respect to said float as a wave trough passes whereby said float tends to rise in said body of liquid.

10. A wave actuated pump apparatus, as described in claim 9, and wherein said release means comprises forming said upstanding wall with a plurality of release openings, and mounting flapper valve members over each of said release openings so as to prevent inward passage of liquid and permit outward flow of liquid from the liquid contained within said peripheral upstanding wall.

11. A wave actuated pump apparatus, as described in claim 10, and wherein said release openings are peripherally spaced in a ring adjacent to the lower edge of said peripheral upstanding wall, and a ring of ingress openings are formed in said peripheral upstanding wall in vertical spaced relation above said ring of release openings.

12. A wave actuated pump apparatus, as described in claim 1, and wherein pressurized reservoir means is connected to said pump and is formed for receiving and storing under pressure the liquid pumped thereby.

13. A wave actuated pump apparatus, as described in claim 12, and wherein said reservoir comprises a tank supported above said main float formed to contain said liquid pumped into said tank and an air cushion, and an outlet from said tank connectable to apparatus for utilizing the energy stored in said tank as said liquid is pumped in.

14. A wave actuated pump apparatus, as described in claim 12, and wherein said reservoir comprises a tank built into the bottom of said main float and formed to contain said liquid pumped into said tank and an air cushion, said tank being formed with an outlet connectable to apparatus for utilizing the energy stored in said tank as said liquid is pumped in.

15. A wave actuated pump apparatus, as described in claim 2, and wherein said member has an A-frame portion with the ends of the legs of the A pivotally attached to said main float for stabilizing the distal end of said member to remain above said pump float.

16. A wave actuated pump apparatus, as described in claim 15, and wherein a tripod member having a front leg and two rear legs is mounted above said A-frame portion with the end of said front leg attached thereto at the apex of the A and the ends said rear legs attached to the legs of the A near their pivotal connection to said main float.

17. A wave actuated pump apparatus, as described in claim 16, and wherein one end of said pump is pivotally secured to a collar selectively positionable along said front leg of said tripod for varying the operating angle of said pump relative to said main float to which the other end of said pump is pivotally attached, and locking means is provided on said collar for releasably locking the latter to said front leg of said tripod at desired positions therealong.

18. A wave actuated pump apparatus, as described in claim 2, and wherein said opposite end of said member is formed with an extension projecting past said pivotal connection of said member to said main float, and a second linearly actuatable pump is pivotally secured between the distal end of said extension and said main float and is formed for exerting its pumping stroke as said pump float rises relative to said main float, said first named pump being formed for exerting its pumping stroke as said pump float descends relative to said main float.

19. A wave actuated pump apparatus, as described in claim 18, and wherein one end of said second pump is pivotally connected to said main float, the other end of said second pump being pivotally connected to a sleeve slidable along said extension for varying the operating angle of said second pump, and second locking means is provided on said collar on said extension for releasably locking said last named collar to said extension at desired positions therealong.

20. A wave actuated pump apparatus, as described in claim 2, and wherein said pump floats and main floats are arranged in a plurality of operative pairs, each of said operative pairs having one of said pump floats and one of said main floats, a plurality of elongated members with one of said members for each of said operative pairs of floats, and frame means formed for securing said operative pairs together with said members nonparallel to each other.

21. A wave actuated apparatus, as described in claim 20, and wherein said main floats of each of said operative pairs are grouped together in proximity to each other and are held in such relationship by said frame means with said members radiating outwardly in desired angular spaced relation so as to position said pump floats in radially and circumferentially spaced relation to said main floats.

22. A wave actuated pump apparatus, as described in claim 21, and wherein three of said operative pairs are provided so that waves on said surface of said body of liquid can never be parallel to the direction of more than one of said members of said operative pairs whereby at least two of said operative pairs will be pumping liquid whenever waves are present.

23. A wave actuated pump apparatus, as described in claim 22, and wherein anchor means is provided for restraining said apparatus against movement across said surface of said body of liquid.

24. A wave actuated pump apparatus, as described in claim 23, and wherein said anchor means is formed to point one of said pump floats on one operative pair in the direction from which the waves are coming whereby each of the three operative pairs receives the waves other than broadside and all three operative pairs pump whenever waves are present.

25. A wave actuated pump apparatus, as described in claim 24, and wherein the said operative pair having its pump float facing tee direction from which the waves are coming is perpendicular to said direction, and the other two operative pairs diverge rearwardly with respect to the plane of said member of said first named operative pair at an angle of between about 30° and about 60°.

26. A wave actuated pump apparatus, as described in claim 24, and wherein the horizontal distance between said pump float and its associated main float approximates one half the distance between adjacent crests of the waves encountered whereby maximum vertical displacement between said floats is accomplished.

* * * * *